Aug. 5, 1924.
C. F. DIKE
1,503,821
COMBINED EXHAUST AND INTAKE MANIFOLD
Filed March 23, 1918
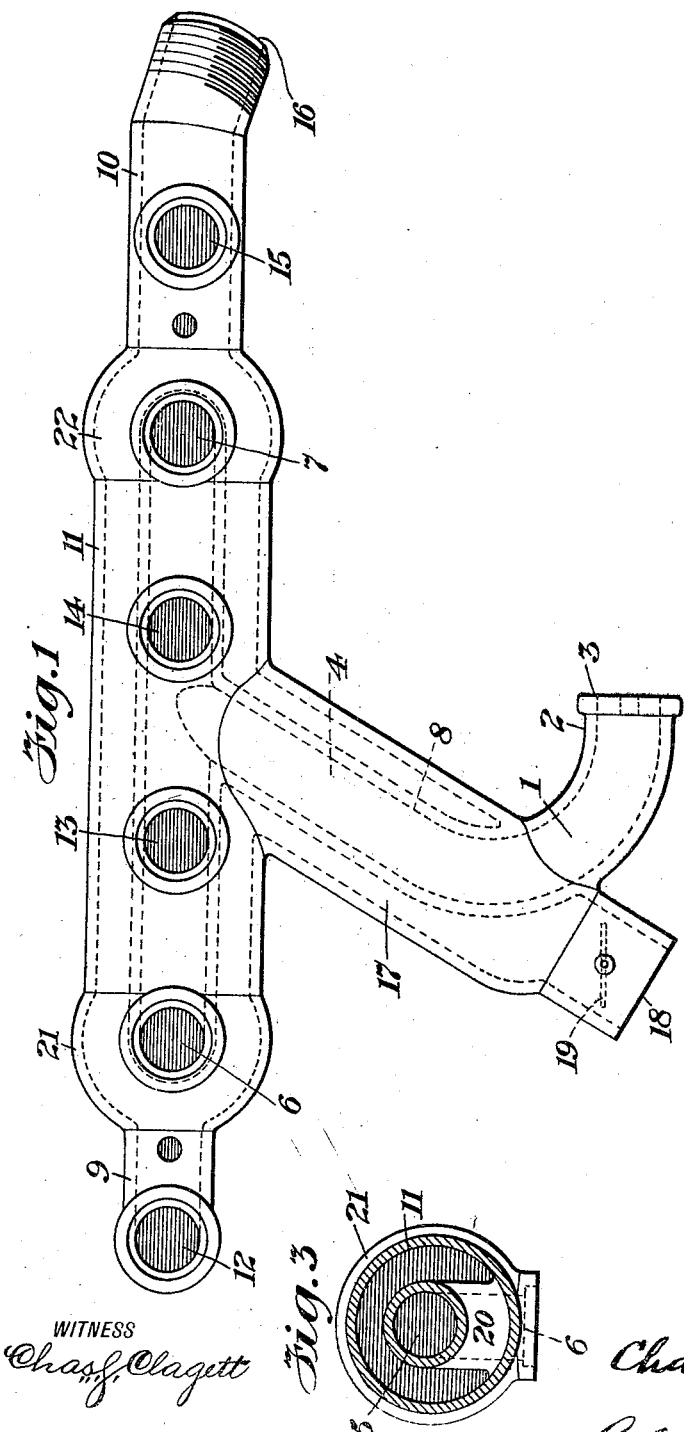

Patented Aug. 5, 1924.

1,503,821

UNITED STATES PATENT OFFICE.

CHARLES F. DIKE, OF JOPLIN, MISSOURI.

COMBINED EXHAUST AND INTAKE MANIFOLD.

Application filed March 23, 1918. Serial No. 224,185.

*To all whom it may concern:*

Be it known that I, CHARLES F. DIKE, a citizen of the United States, and resident of Joplin, in the county of Jasper and State of Missouri, have invented certain new and useful Improvements in Combined Exhaust and Intake Manifolds, of which the following is a specification.

My present invention relates to combined exhaust and intake manifolds for internal combustion engines having a plurality of cylinders, and more particularly to those of the above type in which the intake manifold is disposed within the exhaust manifold so as to be heated thereby. The specific embodiment which I have elected to show herein is adapted to a four-cylinder motor and was in fact designed for the standard four-cylinder motor of the well-known Ford automobile although it is applicable to motors having a greater or less number of cylinders and having other arrangements of exhaust and intake ports. In the Ford motor or any other multiple cylinder motor adapted for the practice of my present invention, the openings for all of the exhausts and all of the intakes are formed in one side of the engine in a straight horizontal row and it is customary to provide one exhaust opening for each cylinder and one inlet opening for each pair of cylinders. This requires four exhaust openings and two inlet openings for a four-cylinder engine.

The object of my invention is to provide an improved manifold combining the exhaust and intake manifolds in one structure with the intake arranged inside of the exhaust in such manner that while the intake passages are of approximately uniform cross-section all the way from the carbureter to the motor cylinders, they are nevertheless so arranged and the exhaust manifold so formed that the exhaust ports are not choked by the walls of the intake and the latter are not too highly heated by too close impingement thereon of the flame of the exhaust.

The above and other features and objects of my invention will be more fully understood from the following description in connection with the accompanaying drawings in which—

Figure 1 is a face elevation looking into the exhaust and inlet ports which fit corresponding openings in the engine;

Figure 2 is a horizontal section on the line 2—2, Figure 1; and

Figure 3 is a vertical section on the line 3—3, Figure 2.

The combined manifold is specially designed so that it may be a single casting if desired. The intake portion consists of the main intake conduit 1 formed with a horizontal portion 2, the end 3 of which is formed for attachment of a cabureter of any known or desired type. The intake conduit turns upwardly into the portion 4 which extends in a direction inclined to the perpendicular and at an acute angle to the direction of the draft coming in through the horizontal portion 2. The sharp deflection of the draft at this point serves to project any of the larger drops of liquid fuel from the draft mixture and the pressure of the draft against the wall at this point operates with gravity to drain any such liquid to the lower portion of the inclined wall at 8, along which portion, it naturally drains back into the top of the draft current entering through the horizontal portion 2. The intake passage 4 leads into the side of the horizontal intake manifold pipe 5, at an acute angle. This pipe is U-shaped and affords branch intake passages which terminate in the intake discharge ports 6, 7, leading to the cylinders of the engine.

The outer exhaust manifold comprises end portions 9, 10, and intermediate portion 11 formed with exhaust receiving ports 12, 13, 14 and 15. The portion 9 is of the same cross-section as the exhaust receiving port 12, while the portion 10 is enough greater in cross-section to afford adequate outlet for the discharge from all of the exhaust receiving ports and terminates in the main exhaust outlet 16 which discharges to atmosphere, customarily through a suitable extension pipe and a muffler, not shown.

A supplementary extension 17 of the exhaust manifold extends downwardly, preferably inclined at an acute angle to the main exhaust manifold, to correspond with the inclination of the intake passage 4. The exhaust extension 17 terminates in an outlet opening 18 at the lower end thereof which may be completely closed or partly or wholly open by adjustment of valve 19, to afford a temporary auxiliary outlet if and when required for the purposes hereinafter described.

The U-shaped pipe 5 forming the branching passages of the intake manifold, is arranged within the exhaust manifold in spaced relation to the walls thereof and the form and relative arrangement of the walls of the exhaust manifold with respect to this portion of the intake manifold constitute important features of my invention.

The central section 11 where the manifold is co-extensive with the pipe 5, is enlarged so as to give the annular exhaust passage between 11 and 5 a cross-sectional area approximately equal to or greater than that of the main exhaust outlet at 10.

Another feature is providing the exhaust manifold with additional enlargements 21, 22, preferably spherical, opposite the points where the ends of the intake manifold 5 are formed at right angled portions 20, 20, which extend radially outward toward the intake discharge openings 6, 7. At this point the radially extending portions 20 afford a serious obstruction to the exhaust as will be evident from Figure 3, but as shown in dotted lines on Figure 1, the spherical enlargements of the exhaust manifold at these points preserve uniformity of the effective cross-sectional area.

Another feature of my invention consists in locating the intake manifold 5 eccentrically of the exhaust manifold passage so as to give greater clearance for the exhaust blast coming in through exhaust openings 13, 14. This expedient serves the double purpose of preventing choking of the exhaust through these openings and at the same time preventing over-heating of the intake passages by too close impingement thereon of the exhaust flame.

The latter is an important feature because I find that under normal conditions of steady running a manifold of this type has a potential heating capacity which if fully utilized will heat the intake draft of air and liquid fuel more than is really necessary for vaporizing purposes, and as the heating effect of the exhaust in this portion of the manifold cannot be adjusted, the original design of the parts must be made such that this non-adjustable part of the heating effect will be predetermined, so as not to be great enough to over-rarefy the air and fuel mixture and thereby cut down the power output of the engine. The latter is a well-known result of the overheating which has resulted in many prior devices, designed for utilizing kerosene, low grade gasoline and other of the less volatile hydrocarbons. The opposite extreme, namely, too little heat for starting and other emergency operations, I am able to avoid by the wide variations of heating effect obtainable from the branch exhaust extension 17 which are controllable to the fullest extent by opening or closing the auxiliary exhaust outlet 18 by means of valve 19.

In the manifold above described, the intake manifold is wholly within the exhaust manifold, yet the entire exhaust passage has effective cross-sections approximately proportional to the volume of exhaust which must be delivered through the main exhaust 16, and hence is well adapted to keep the exhaust draft moving more uniformly toward said main exhaust outlet 16. There are no abrupt or undue enlargements or eddy pockets and the draft created by each exhaust assists and accelerates the succeeding with the least possible eddying and without causing excessive back pressure.

The structural features whereby these objects are achieved are the above described spacing of the U-shaped intake manifold away from the exhaust inlet ports, enlarging the diameter of the exhaust manifold throughout a distance co-extensive with said portion of the intake manifold and further enlarging, preferably spherically, the portions of the exhaust manifold adjacent the transversely extending end portions of the intake manifold.

It will be noted that the opening where the exhaust extension 17 joins the manifold 11 affords a relief for the radial obstruction where main intake pipe 4 crosses the path of the draft toward the main exhaust outlet 16.

I claim:

1. An exhaust manifold, an intake manifold having an approximately horizontal portion wholly within and in spaced relation to all the walls of the exhaust manifold and formed with outlet passages opening through the exhaust manifold on the same side and in alignment with the exhaust receiving ports thereof, said intake manifold being arranged opposite to but spaced farther from the exhaust ports than from the wall of the exhaust manifold opposite said exhaust parts, said exhaust manifold being formed with enlargements opposite said outlet portion of said intake manifold for the purpose described.

2. A combined intake and exhaust manifold for explosive motors consisting of an integral casting comprising an exhaust manifold formed with end and intermediate exhaust receiving ports on one side thereof and a main exhaust outlet at one end thereof together with an intake manifold disposed wholly within and in spaced relation to all the walls of said exhaust manifold, having mixture outlet ports between the end and the intermediate exhaust receiving ports, said intake manifold being arranged in the same horizontal plane with the exhuast openings but spaced nearer to the opposite wall than to said exhaust ports for the purpose described.

Signed at Joplin, in the county of Jasper and State of Missouri, this 19th day of March, A. D. 1918.

CHARLES F. DIKE.